United States Patent
Komikado

(10) Patent No.: US 8,799,534 B2
(45) Date of Patent: Aug. 5, 2014

(54) STORAGE APPARATUS AND METHOD FOR CONTROLLING SAME

(75) Inventor: Kosuke Komikado, Odawara (JP)

(73) Assignee: Hitachi, Ltd., Chiyoda-Ku (JP)

( * ) Notice: Subject to any disclaimer, the term of this patent is extended or adjusted under 35 U.S.C. 154(b) by 296 days.

(21) Appl. No.: 13/383,044

(22) PCT Filed: Dec. 27, 2011

(86) PCT No.: PCT/JP2011/007318
§ 371 (c)(1),
(2), (4) Date: Jan. 9, 2012

(87) PCT Pub. No.: WO2013/098888
PCT Pub. Date: Jul. 4, 2013

(65) Prior Publication Data
US 2013/0166797 A1 Jun. 27, 2013

(51) Int. Cl.
*G06F 3/00* (2006.01)
*G06F 5/00* (2006.01)
*G06F 13/12* (2006.01)
*G06F 13/38* (2006.01)

(52) U.S. Cl.
USPC .................... 710/36; 710/37; 710/39; 710/74

(58) Field of Classification Search
USPC ........................ 710/74, 36, 37, 39
See application file for complete search history.

(56) References Cited

U.S. PATENT DOCUMENTS

| | | | |
|---|---|---|---|
| 2008/0005490 A1* | 1/2008 | Shiraki et al. | 711/147 |
| 2009/0228610 A1* | 9/2009 | Uchida | 710/5 |
| 2010/0011129 A1* | 1/2010 | Bita | 710/5 |
| 2010/0107161 A1 | 4/2010 | Nishikawa | |

FOREIGN PATENT DOCUMENTS

| | | |
|---|---|---|
| EP | 1533690 A2 | 5/2005 |
| JP | 2010-108114 A | 5/2010 |

\* cited by examiner

*Primary Examiner* — Farley Abad
(74) *Attorney, Agent, or Firm* — Volpe and Koenig, P.C.

(57) ABSTRACT

Proposed are a storage apparatus and controlling method to prevent deterioration in the response performance of the whole system effectively. A storage apparatus provides a host computer with one or more storage areas for reading and writing data to the corresponding storage areas based on commands from the host computer. The number of receivable commands from the host computer is managed according to preconfigured management modes for managing the number of receivable commands. The management modes comprise at least one management mode among a first management mode for managing the number of receivable commands for each of the storage areas, a second management mode for managing the number of receivable commands in host group units which are sets of one or more of the host computers, and a third management mode for managing the number of receivable commands in identification information units assigned to the logged on host computers.

10 Claims, 11 Drawing Sheets

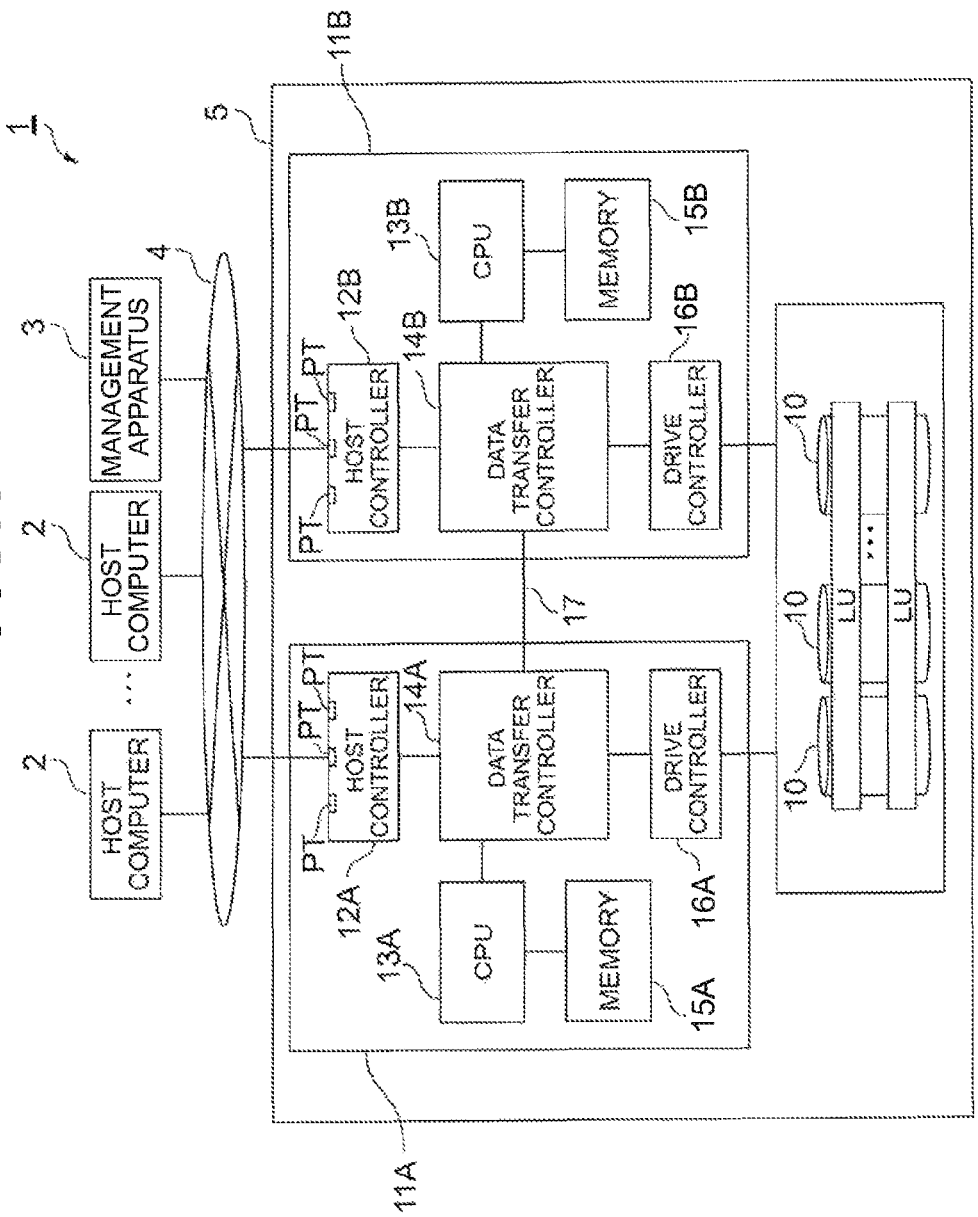

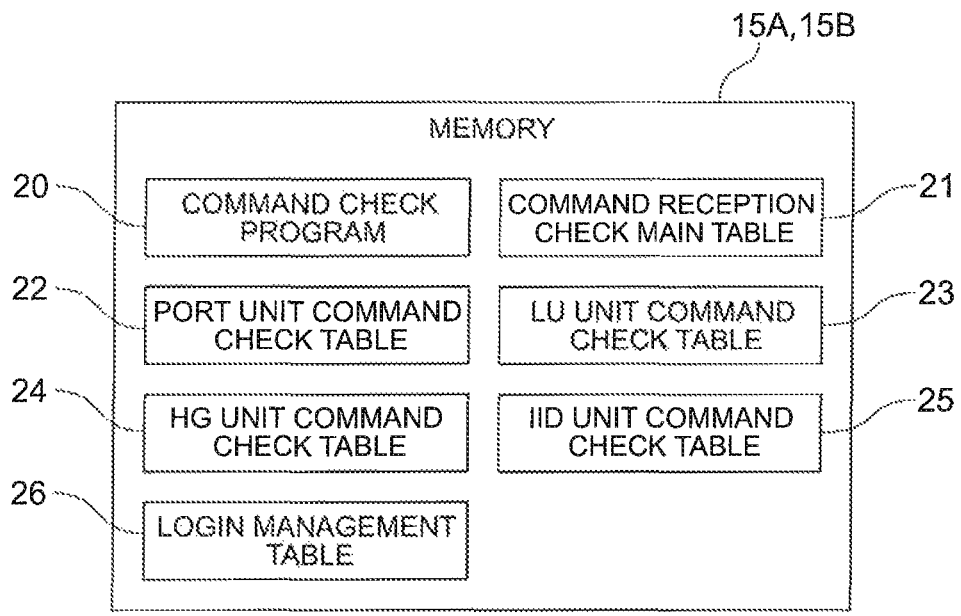

FIG.4

| PORT NUMBER | COMMAND STATE | EXECUTION COMMAND COUNT | RECEIVABLE COMMAND COUNT |
|---|---|---|---|
| 0 | RECEIVABLE | 8 | 12 |
| 1 | UN-RECEIVABLE | 0 | 9 |
| .... | .... | .... | .... |
| 22A | 22B | 22C | 22D |

| LUN | COMMAND STATE | EXECUTION COMMAND COUNT | RECEIVABLE COMMAND COUNT |
|---|---|---|---|
| 0 | RECEIVABLE | 2 | 8 |
| 1 | UN-RECEIVABLE | 0 | 8 |
| .... | .... | .... | .... |
| 23A | 23B | 23C | 23D |

| HG# | PRIORITY | COMMAND STATE | EXECUTION COMMAND COUNT | RECEIVABLE COMMAND COUNT |
|---|---|---|---|---|
| 0 | 0 | UN-RECEIVABLE | 10 | 10 |
| 1 | 1 | RECEIVABLE | 7 | 10 |
| .... | .... | .... | .... | .... |

| IID | LOGIN STATE | COMMAND STATE | EXECUTION COMMAND COUNT | COMMAND RECEPTION TIME | I/O EXECUTION STATE | RECEIVABLE COMMAND COUNT |
|---|---|---|---|---|---|---|
| 0 | LOGGED IN | RECEIVABLE | 8 | 2011/08/15 09:37:03 | I/O PRESENT | 10 |
| 1 | LOGGED OUT | — | — | 2011/07/31 23:18:47 | — | — |
| ..... | ..... | ..... | ..... | ..... | ..... | ..... |
| 25A | 25B | 25C | 25D | 25E | 25F | 25G |

25

| IID | VALID/INVALID FLAG | PARTNER PORT ID | HG NUMBER |
|---|---|---|---|
| 0 | 1 | Port1 | HG1 |
| 1 | 1 | Port2 | HG3 |
| .... | .... | .... | .... |

26A / 26B / 26C / 26D   26

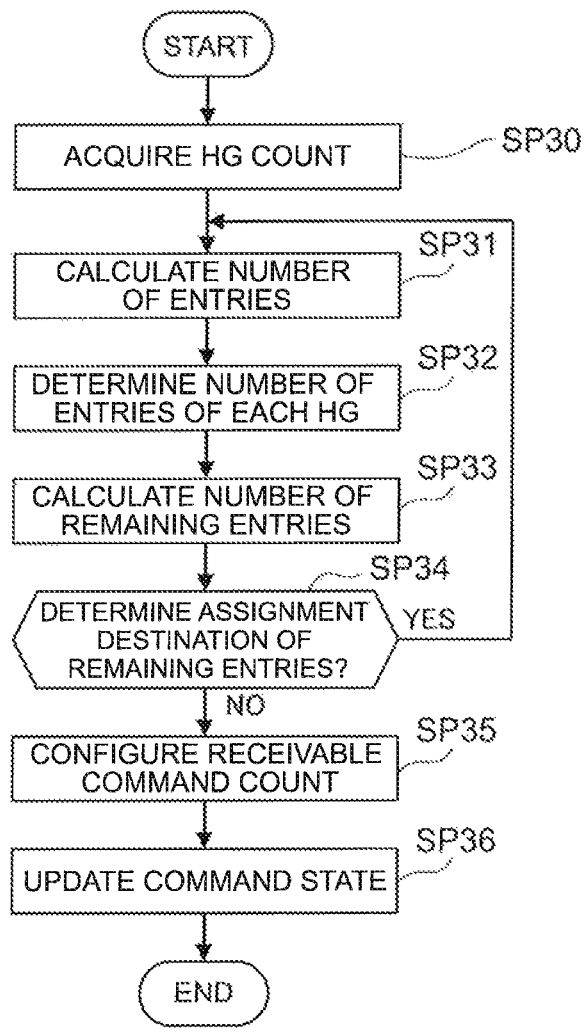

STORAGE APPARATUS AND METHOD FOR CONTROLLING SAME

TECHNICAL FIELD

The present invention relates to a storage apparatus and a method for controlling same and is suitably applied to a storage apparatus which comprises a function for managing the number of receivable commands from a host computer.

BACKGROUND ART

Conventionally, a port unit queue full response system has been widely adopted as a command control system of a storage apparatus. This port unit queue full response system is a system in which command queues are provided so as to correspond to each port of the storage apparatus, and in which a response (hereinafter called a queue full response) to the effect that queuing is only possible for the host computers connected to ports associated with the command queue is transmitted at the stage where a fixed number of commands or more have accumulated in the command queue.

CITATION LIST

Patent Literature

PTL 1: Japanese Published Unexamined Patent Application No. 2010-108114

SUMMARY OF INVENTION

Technical Problem

However, if this port unit queue full response system is applied in an environment where a plurality of host computers are connected to a single port, there is a problem in that, even if the command queue is full as a result of a large number of commands being issued by a single host computer among the plurality of host computers, a queue full response is then transmitted to all the host computers connected to the ports associated with the command queue, thus leading to deterioration in the response performance of the whole system.

Note that, as a method of managing the response performance as a computer system, PTL 1 discloses linking a server, which includes a virtual server management program for adjusting the I/O processing performance between virtual servers, and a storage system, by controlling the I/O processing of the virtual services according to the I/O priority for each virtual server provided by the server.

The present invention was conceived in view of the above points and proposes a storage apparatus and a method of controlling same which make it possible to prevent deterioration in the response performance of the whole system effectively and in advance.

Solution to Problem

In order to achieve the foregoing object, the present invention provides a storage apparatus which provides a host computer with one or more storage areas which are storage areas for reading and writing data and which reads and writes data to the corresponding storage areas on the basis of commands supplied from the host computer, the storage apparatus comprising a management unit which manages the number of commands that can be received; and a storage unit which stores preconfigured management modes for managing the number of commands that can be received, wherein the management modes comprise at least one management mode among a first management mode for managing the number of receivable commands for each of the storage areas, a second management mode for managing the number of receivable commands in host group units which are sets of one or more of the host computers, and a third management mode for managing the number of receivable commands in identification information units assigned to the logged on host computers, wherein the management unit manages the number of receivable commands supplied from the host computer according to the management modes stored in the storage unit.

The present invention further provides a method for controlling a storage apparatus which provides a host computer with one or more storage areas which are storage areas for reading and writing data and which reads and writes data to the corresponding storage areas on the basis of commands supplied from the host computer, the method for controlling a storage apparatus comprising a first step of storing preconfigured management modes for managing the number of commands that can be received; and a second step of managing the number of receivable commands supplied from the host computer according to the management modes stored in the storage unit, wherein the management modes comprise at least one management mode among a first management mode for managing the number of receivable commands for each of the storage areas, a second management mode for managing the number of receivable commands in host group units which are sets of one or more of the host computers, and a third management mode for managing the number of receivable commands in identification information units assigned to the logged on host computers.

Therefore, with the storage apparatus and method for controlling same, even in a case where there is a high load host computer among host computers using the same port, it is possible to prevent the influence of the high load host computer on another host computer which uses a different logical unit from the host computer, on another host computer which belongs to a different host group from the host computer, or on another host computer.

Advantageous Effects of Invention

The present invention enables implementation of a storage apparatus and a method of controlling same which make it possible to prevent deterioration in the response performance of the whole system effectively and in advance.

BRIEF DESCRIPTION OF DRAWINGS

FIG. 1 is a block diagram showing the overall configuration of a computer system according to this embodiment.

FIG. 2 is a block diagram showing a program and various tables which are stored in memory.

FIG. 3 is a conceptual diagram showing a configuration of a command reception check main table.

FIG. 4 is a conceptual diagram showing a configuration of a port unit command check table.

FIG. 5 is a conceptual diagram showing a configuration of a logical unit unit command check table.

FIG. 6 is a conceptual diagram showing a configuration of a host group unit command check table.

FIG. 7 is a conceptual diagram showing a configuration of an initiator ID unit command check table.

FIG. 12 is a conceptual diagram serving to illustrate the ratio of the receivable command count assigned to each of the high priority and low priority host groups.

FIG. 13 is a flowchart showing a processing routine for priority configuration/modification processing.

DESCRIPTION OF EMBODIMENTS

Figures 8, 9:
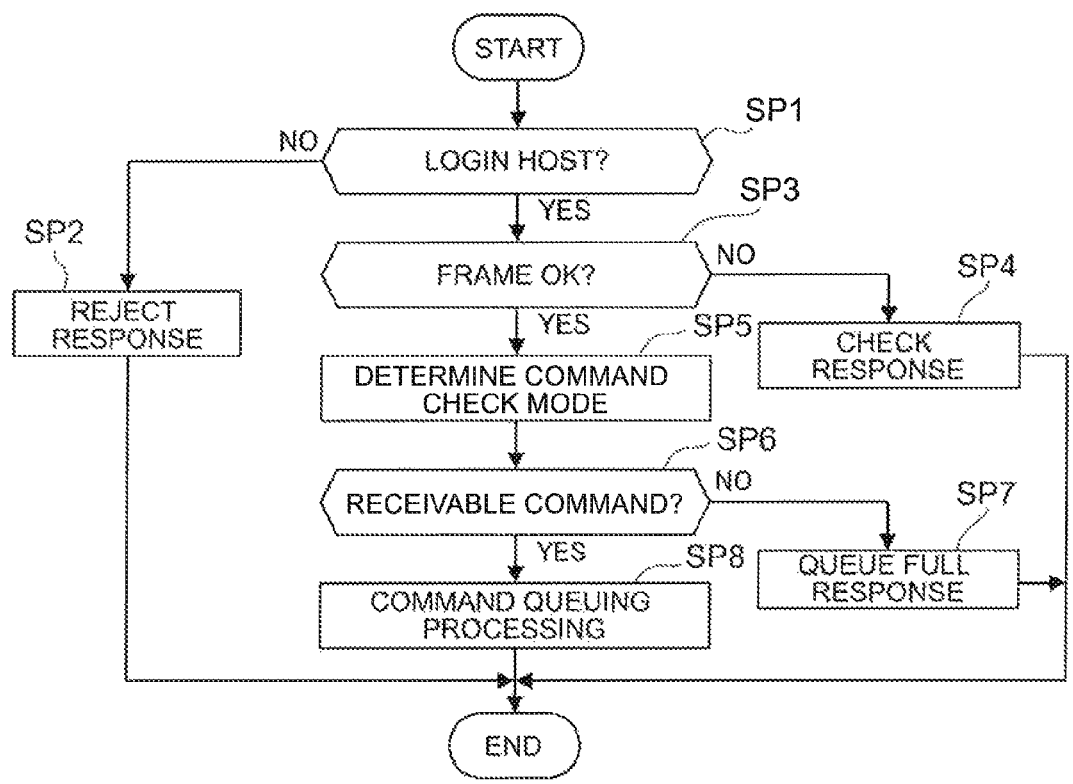
FIG. 8 is a conceptual diagram showing a configuration of a login management table.
FIG. 9 is a flowchart showing a processing routine for command reception processing.

An embodiment of the present invention will be described in detail hereinbelow reference to the drawings.

(1) A Configuration of a Computer System According to this Embodiment

In FIG. 1, 1 denotes the overall computer system according to this embodiment. The computer system 1 is configured such that one or more host computers 2 and a management apparatus 3 are connected to a storage apparatus 5 via a network 4.

The host computer 2 is a computer device comprising information processing resources such as a CPU (Central Processing Unit) and a memory and is, for example, configured from a personal computer, a workstation, or a mainframe. The host computer 2 comprises information input devices (not shown) such as a keyboard, a switch, a pointing device and a microphone, and information output devices (not shown) such as a monitor display and speaker.

The management apparatus 3 is a computer device which the system administrator uses to manage the computer system 1 and is configured from a personal computer, a workstation, or a mainframe or the like, for example. The management apparatus 3 comprises, similarly to the host computer 2, information input devices (not shown) such as a keyboard, a switch, a pointing device and a microphone, and information output devices (not shown) such as a monitor display and a speaker.

The network 4 is configured, for example, from a SAN (Storage Area Network), a LAN (Local Area Network), the Internet, a public line or a dedicated line or the like. Communications between the host computer 2, the management apparatus 3, and the storage apparatus 5 via the network 4 are performed in accordance with the Fibre Channel protocol if the network 4 is a SAN, for example, and communications are performed in accordance with the TCP/IP (Transmission Control Protocol/Internet Protocol) protocol if the network 4 is a LAN.

The storage apparatus 5 is configured comprising a plurality of storage devices 10 and two controllers 11A and 11B on channels 0 and 1 for controlling data I/Os from/to the plurality of storage devices 10.

The storage devices 10 are configured from high-cost disk devices such as SCSI (Small Computer System Interface) disks or low-cost disk devices such as SATA disks (Serial AT Attachment) disks or optical disks, or the like, for example.

The storage devices 10 are applied in a RAID (Redundant Arrays of Inexpensive Disks) system by means of each of the controllers 11A and 11B on channels 0 and 1. One or more logical volumes (hereinafter called logical units) LU are configured in physical storage areas provided by one or more storage devices 10. Further, the data is stored in the logical units LU by taking blocks of a predetermined size (hereinafter called logical blocks) as units.

The logical units LU are each assigned a unique identifier (hereinafter called a LUN (Logical Unit number). In the case of this embodiment, data I/Os are performed by designating addresses obtained by combining the LUN with numbers specific to the logical blocks (called LBA (Logical Block Addresses) hereinbelow) which are assigned to each of the logical blocks.

The controllers 11A and 11B of channels 0 and 1 are configured comprising, respectively, a host controller 12A, 12B, a CPU 13A, 13B, a data transfer controller 14A, 14B, a memory 15A, 15B, and a drive controller 16A, 16B.

The host controllers 12A, 12B are interfaces with the network 4 and comprise information processing resources such as a CPU and memory. The host controllers 12A, 12B comprise one or more ports PT, are connected to the network 4 via the ports, and send and receive various commands, write data and read data to and from the host computer 2 via the network 4.

The CPU 13A, 13B are processors which control data I/Os to and from the storage devices 10 in response to write commands and read commands from the host computer 2 and control the host controllers 12A, 12B, the data transfer controllers 14A, 14B, and the drive controllers 16A, 16B on the basis of microprograms which are read from the storage devices 10.

The data transfer controllers 14A, 14B comprise a function for switching the data transfer source and transfer destination between the host controllers 12A, 12B, the memory 13A, 13B, and the drive controllers 16A, 16B, and are configured from a PCIe (PCI (peripheral component interconnect) Express) switch, for example.

Furthermore, the data transfer controllers 14A, 14B are connected via a bus 17 to the data transfer controller 14B, 14A of the other channel (0 or 1) so as to be able to send and receive commands and data to and from the data transfer controller 14B, 14A on the other channel via the bus 17.

The memories 15A, 15B are also used as working memories of the CPU 12A, 12B in addition to being used to temporarily store data which is transferred between the host controller 12A, 12B and the drive controller 16A, 16B. The memory 15A, 15B also stores the foregoing microprograms and various system information which are read from a predetermined storage device 10 when the storage apparatus 5 is started up.

The drive controllers 16A, 16B are interfaces with the storage devices 10 and comprise information processing resources such as a CPU and a memory. The drive controllers 16A, 16B read and write the write data and read data in the address position designated by the write command or read command in the logical unit LU designated in the write command or read command by controlling the corresponding storage device 10 in response to a write command or read command from the host computer 2 which is supplied from the host controller 12A, 12B.

(2) Command Control Function According to this Embodiment

A command control function which is installed in the storage apparatus 5 will be described next. In the case of this embodiment, the storage apparatus 5 includes, as operation modes (hereinafter called the command check modes) for managing the number of receivable commands (called the receivable command count hereinbelow), four command check modes, namely, a port unit command check mode, a logical unit unit command check mode, a host group unit command check mode and an initiator ID unit command check mode. Furthermore, in the storage apparatus 5, a desired single command check mode can be selected and configured from among the four command check modes.

Among these modes, the port unit command check mode is a mode for managing the number of commands which can be received in port PT units of the host controllers 12A, 12B (hereinafter called the receivable command count).

A command queue (not shown) is configured in the storage apparatus 5 to correspond to the host controllers 12A, 12B respectively, and therefore, in the port unit command check mode, a queue full response is transmitted to the host computer connected to the port PT associated with the command queue at the stage where a certain number of commands or more have accumulated in the command queues.

Furthermore, the logical unit unit command mode is a mode for uniformly distributing, for each of the ports PT of the host controllers 12A, 12B, the usable number of command queue entries associated with the port PT among each of the logical units LU mapped to the ports PT and for managing the number of receivable commands in logical unit units.

For example, in a "one logical unit for one host" environment where only one host computer 2 is associated with one logical unit LU, a queue full response can be issued only to the host computer 2 using the logical unit LU by applying this logical unit unit command check mode. That is, in a "one logical unit for one host" environment, a logical unit unit queue full response is similar to a host computer unit queue full response, and a single command-queue queue full can be controlled without affecting the other host computer 2.

Furthermore, in a "one logical unit for a plurality of hosts" environment where a plurality of host computers 2 are associated with a single logical unit LU, data must be protected by exclusively executing command processing by using a SCSI (Small Computer System Interface): dual standard reserve/release command in order to ensure data consistency. However, in command processing using a reserve/release command, the I/O efficiency of the overall system worsens because the command operation of the other host computer 2 is halted. Therefore, recent virtual servers support a function for executing block (metadata) unit data protection by means of VMware (VMware is a registered trademark) ESX4.1 or subsequent VAAI/Hardware Assist Lock or the like, H/W Assist. That is, even in the case of a "one logical unit for a plurality of hosts" configuration in a virtualization environment in which SCSI and dual standard reserve/release commands are not used, as described above, control is possible in which the queue full of a single command queue does not affect the other host computer 2.

In addition, a host group unit command check mode is a mode for distributing, for each of the ports PT of the host controllers 12A, 12B, the usable number of command queue entries associated with the port PT among each of the host groups created in the ports PT, and for managing the number of receivable commands in host group units. Note that the host group is a series of host computers 2 which are configured from one or more host computers 2 defined by the user.

With the host group unit command check mode, since the host computer 2 transmitting the queue full response can be limited to only the host computers belonging to the corresponding host group, it is possible to curb deterioration in the performance of the whole computer system.

The initiator ID unit command check mode is a mode for distributing, for each of the ports PT of the host controllers 12A, 12B, the usable number of command queue entries associated with the port PT among each of the initiator IDs, and for managing the number of receivable commands in initiator ID units. Here, initiator IDs are identifiers unique to the host computers 2 assigned to the host computers 2 which the storage apparatus 5 has been able to log onto and these identifiers are used only to identify the host computers 2 in the storage apparatus 5. The number of initiator IDs is therefore the same as the number of logged onto host computers 2.

With the initiator ID unit command check mode, the number of receivable commands distributed among the individual initiator Ms (host computers) varies depending on the number of host computers 2 that have logged onto the storage apparatus 5. As a result, command control which is suited to the actual user environment can be performed.

Furthermore, in the initiator ID unit command check mode, by making, among the host computers 2 which are logged on, only the host computer 2 which actually issued the I/O command the target of command control in the initiator ID unit command check mode, command control and the configuration of the optimum number of receivable commands can be performed dynamically in a high load environment. If dynamic optimization is performed, configuration by the system administrator is not required and therefore the system administrator need not be aware of the effect, on the other host computer 2, of the load which either host computer 2 exerts on the storage apparatus 5, whereby simplification of the system design is possible.

A case is described hereinbelow where, if the initiator ID unit command check mode is configured, instead of all the host computers 2 logged onto the storage apparatus 2 being targeted, only the initiator ID assigned to the host computer 2 which actually issued the write command or read command is targeted for distribution of the usable number of command queue entries.

As means for realizing the command control function according to this embodiment hereinabove, the memory 13A, 13B of the storage apparatus 5 stores, as shown in FIG. 2, a command check program 20, a command reception check main table 21, a port unit command check table 22, a logical unit unit command check table 23, a host group unit command check table 24, an initiator ID unit command check table 25 and a login management table 26.

The command check program 20 is a program for executing various processing relating to the command control function. Various processing relating to the command control function, described subsequently, is executed as a result of the CPU 13A, 13B executing the command check program 20.

Meanwhile, the command reception check main table 21 is a table which is used to confirm the command check mode or the like configured on the current storage apparatus 5 when a command is received, and this table 21 is created for each port PT. The command reception check main table 21 is, as shown in FIG. 3, configured from a configuration command check mode field 21A, a logical unit count field 21B, a host group count field 21C, an initiator ID count field 21D, and an I/O execution host count field 21E.

The configuration command check mode field 21A stores a mode name of the command check mode configured in the current storage apparatus 5 and the logical unit count field 21B stores the total number of logical units LU mapped to the corresponding ports PT.

Furthermore, the host group count field 21C stores the total number of host groups created in the corresponding ports PT and the initiator ID count field 21D stores the total number of initiator IDs assigned to the host computers 2 logged onto the storage apparatus 5 via these ports PT. In addition, the I/O execution host count field 21E stores the total number of host computers (hereinafter called the I/O execution host computer) 2 which issued the I/O command (read command and/or write command) in a predetermined time (hereinafter called the command reception threshold time) among the host computers 2 that have logged on.

Meanwhile, the port unit command check table 22 is a table which is used when the port unit command check mode is configured as the command check mode for the whole storage apparatus 5 and, as shown in FIG. 4, is configured from a port number field 22A, a command state field 22B, an execution command count field 22C, and a receivable command count field 22D.

Further, the port number field 22A stores the port numbers of the ports PT associated with the entries (rows) and the command state field 22B stores information (hereinafter called command state information) indicating whether commands targeting the ports PT can be received. In addition, the execution command count field 22C stores the number of commands being executed among the commands targeting the ports PT already received.

In addition, the receivable command count field 22D stores the number of receivable commands (receivable command count) targeting the ports PT. The receivable command count $CRIV_{LU}$ corresponds to the number of command queue entries which is configured corresponding to the port PT.

Furthermore, the logical unit unit command check table 23 is a table which is used when the logical unit unit command check mode as a command check mode of the whole storage apparatus 5 and is created for each port PT. The logical unit unit command check table 23 is configured from an LUN field 23A, a command state field 23B, an execution command count field 23C, and a receivable command count field 23D.

The LUN field 23A stores the LUN of the logical units LU which are mapped to the corresponding ports PT and the command state field 23B stores command state information indicating whether commands targeting logical units LU are in a receivable state. Further, the execution command count field 23C stores, among the commands targeting the logical units LU already received, the number of commands currently being executed.

Further, the receivable command count field 23D stores the number of receivable commands (receivable command count) targeting the logical units LU. The receivable command count $CRIV_{LU}$ is a value which is calculated using the following equation Math 1

$$CRIV_{LU} = \frac{CCEV}{LUV} \quad (1)$$

by making the number of command queue entries configured for the corresponding ports PT as CCEV, and the number of logical units LU mapped to the ports PT as LUV.

In addition, the host group unit command check table 24 is a table which is used when the host group unit command check mode is configured as the command check mode for the whole storage apparatus 5 and is therefore created for each port PT. The host group unit command check table 24 is configured from a host group number field 24A, a priority field 24B, a command state field 24C, an execution command count field 24D, and a receivable command count field 24E.

Furthermore, the host group number field 24A stores an identification number (host group number) which is assigned to the host group created in the corresponding port PT, and the priority field 24B stores a priority configured for the host group. Note that host group priorities will be described subsequently.

Further, the command state field 24C stores information indicating whether the commands from the host computers 2 belonging to the host group are in a receivable state and the execution command count field 24D stores the number of commands currently being executed among the commands received by the storage apparatus 5 which is issued from the host computer 2 which belong to the host group.

In addition, the receivable command count field 24E stores the number of receivable commands (receivable command count) from the host computers 2 belonging to the host groups. If the priorities, described subsequently, have not been configured, the receivable command count $CRIV_{HG}$ is a value which is calculated using the following equation Math 2

$$CRIV_{HG} = \frac{CCEV}{HGV} \quad (2)$$

by taking the number of command queue entries configured for the corresponding ports PT as CCEV and taking the number of host groups created on the corresponding ports PT as HGV.

The initiator ID unit command check table 25 is a table which is used when the initiator ID unit command check mode is configured as the command check mode of the whole storage apparatus 5 and is created for each of the polls PT. The initiator ID unit command check table 25 is configured from an initiator ID field 25A, a login state field 25B, a command state field 25C, an execution command count field 25D, a command reception time field 25E, an I/O execution state field 25F and a receivable command count field 25G.

Furthermore, the initiator ID field 25A stores the initiator IDs which are assigned to the host computers 2 logged on via the corresponding ports PT, and the login state field 25B stores information (login state information) indicating whether the host computers 2 to which the initiator IDs are assigned are logged onto the storage apparatus 5.

In addition, the command state field 25C stores information (command state information) indicating whether the commands from the host computer 2 are in a receivable state, and the execution command count field 25D stores the number of commands currently being executed among the commands received by the storage apparatus 5 which are issued by the host computers 2. Further, the command reception time field 25E stores the time the command from the host computer 2 was last received by the storage apparatus 5.

The I/OI execution state field 25F stores information (referred to as the I/O execution state information hereinbelow) indicating the states of the data I/Os to and from the storage apparatus 5 of the host computer 2. More specifically, though the host computer 2 is logged on, if, after the storage apparatus 5 finally receives an I/O command (read command or write command) from the host computer 2, the next I/O command is not received within the foregoing command reception threshold time, the information "I/O exists" is stored in the I/O execution state field of the entry (row) corresponding to the host computer 2. Further, if the command reception threshold time has not elapsed since the I/O command from the host computer 2 is finally received by the storage apparatus 5, the information "no I/O" is stored in the I/O execution state field of the entry corresponding to the host computer 2.

In addition, the receivable command count field 25G stores the numbers of receivable commands (receivable command count) from the host computers 2 to which the initiator IDs are assigned. The receivable command count $CRIV_{IID}$ is a value that is calculated using the following equation Math 3

$$CRIV_{IID} = \frac{CCEV}{IIDV} \tag{3}$$

by taking the number of command queue entries configured for the corresponding port PT as CCEV and the number of I/O execution host computers 2 among the host computers 2 which are logged on via the port PT as IIDV.

In addition, the login management table 26 is a table which is used to manage the host computers 2 currently logged onto the storage apparatus 5 and, as shown in FIG. 8, is configured from an initiator ID field 26A, a valid/invalid flag field 26B, a partner port ID field 26C, and a host group number field 26D.

Further, the initiator ID field 26A stores the initiator IDs assigned to the loved on host computers 2 and the valid/invalid flag field 26B stores a flag indicating whether the initiator ID is valid or invalid. For example, if the host computer 2 to which the initiator ID is assigned is also currently logged on, "1", which signifies that the initiator ID is valid, is stored in the valid/invalid flag field 26B. Further, if the host computer 2 to which the initiator ID is assigned has already been logged out, "0", which signifies that the initiator ID is invalid is stored in the valid/invalid flag field 26B.

Furthermore, the partner port ID field 26C stores the port ID (more specifically, a network address such as a WWN) which is the connection destination of the corresponding host computer 2, and the host group number field 26D stores the host group number of the host group if the host computer 2 belongs to any of the host groups.

(3) Various Processing Relating to the Command Control Function

The specific processing content of various processing which is executed by the CPU 13A, 13B of the storage apparatus 5 in connection with the foregoing command control function will be described next.

(3-1) Command Reception Processing

FIG. 9 shows a processing routine for command reception processing which is executed by the CPU 13A, 13B of the storage apparatus 5 which receives a command (read command or write command) from the host computer 2.

Upon receipt of a command from the host computer 2, the CPU 13A, 13B starts the command reception processing and first refers to the login management table 26 (FIG. 8) to determine whether the host computer 2 that issued the command is logged onto its own storage apparatus 5 (SP1). Further, if a negative result is obtained in this determination, the CPU 13A, 13B transmits a reject response rejecting this command to the host computer 2 (SP2) and subsequently terminates the command reception processing.

If, however, a negative result is obtained in the determination of step SP1, the CPU 13A, 13B checks the header of the command and determines whether there is a problem with the command such as a corrupt frame (SP3). Further, if a negative result is obtained in this determination, the CPU 13A, 13B transmits the check response to the effect that the command is invalid to the host computer that transmitted the command (SP4) and then terminates the command reception processing.

If, however, an affirmative result is obtained in the determination of step SP3, the CPU 13A, 13B refers to the configuration command check mode field 21A of the command reception check main table 21 (FIG. 3) associated with the port TP receiving the command and in order to determine the command check mode that is currently configured in the storage apparatus 5 (SP5).

The CPU 13A, 13B then refers to the corresponding command state fields 22B, 23B, 24C, and 25C in the command check table corresponding to the current command check mode acquired in step SP5 in the foregoing port unit command check table 22, the logical unit unit command check table 23, the host group unit command check table 24, and the initiator ID unit command check table 25 which are illustrated earlier in FIGS. 4 to 7, in order to determine whether the command targeted at the time is receivable (SP6).

Note that the "corresponding command state fields 22B, 23B, 24C, and 25C" referred to here denotes the command state field 22B of the entry (row) corresponding to the port PT that receives the command in the port unit command check table 22 if the port unit command check mode has been configured as the command check mode of the storage apparatus 5 and denotes the command state field 23B of the entry corresponding to the access destination logical unit designated in the command among the entries in the logical unit unit command check table 23 if the logical unit unit command check mode has been configured as the command check mode.

Also note that this denotes the command state field 24C of the entry corresponding to the host group to which the transmission source host computer 2 belongs of this command among the entries (rows) in the host group unit command check table 24 if the host group unit command check mode has been configured as the command check mode of the storage apparatus 5 and denotes the command state field 25C of the entry corresponding to the initiator ID assigned to the host computer 2 that transmitted the command among the entries in the initiator ID unit command check table 25 if the initiator ID unit command check mode has been configured as this command check mode.

Further, upon obtaining a negative result in the determination of step SP6, the CPU 13A, 13B transmits a queue full response to the host computer 2 that issued the command (SP7) and then terminates the command reception processing.

If, however, an affirmative result is obtained in the determination of step SP6, the CPU 13A, 13B executes command queuing processing to store the command then targeted in the command queue and updates each command check table (SP8).

More specifically, in step SP8, the CPU 13A, 13B increments (adds to) the execution command counts stored in the execution command fields 22C, 23C, 24D, 25D and updates the command reception time, stored in the command reception time field 25E in the corresponding initiator ID unit command check table 25, to the time when the currently targeted command was received, for all of the port unit command check table 22, the corresponding logical unit unit command check table 23, the host group unit command check table 24, and the initiator ID unit command check table 25.

Further, in step SP8, the CPU 13A, 13B compares the execution command counts stored in the execution command count fields 22C, 23C, 24D, and 25D updated as described above with the receivable command counts stored in the receivable command count fields 22D, 23D, 24E, and 25G of the same entries, and if the execution command counts are greater than the receivable command counts, the CPU 13A, 13B updates the command states stored in the command state fields 22B, 23B, 24C, and 25C to "unreceivable."

The CPU 13A, 13B subsequently terminates the command reception processing.

(3-2) Command Execution Processing

Figure 10:
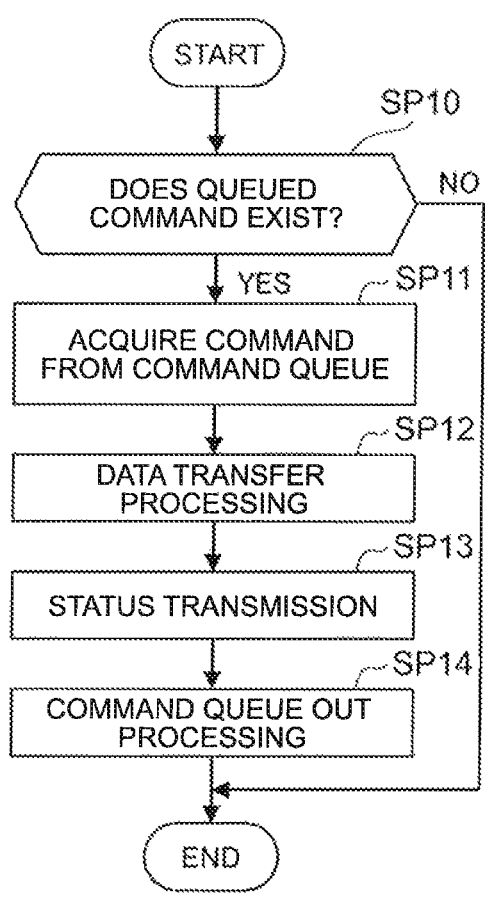
FIG. 10 is a flowchart showing a processing routine for command execution processing.

Meanwhile, FIG. 10 shows a processing routine for command execution processing which is executed in parallel to the command reception processing described earlier in FIG. 9. The CPU 13A, 13B executes commands stored in the command queues by executing the command execution processing for individual command queues configured so as to correspond to each of the ports PT.

In other words, when in a load state where commands can be processed, the CPU 13A, 13B start the command execution processing and first selects one command queue and determines whether a command is stored in the command queue (hereinafter called the target command queue) (SP10). Further, if a negative result is obtained in this determination, the CPU 13A, 13B terminates the command execution processing.

If, however, an affirmative result is obtained in the determination of step SP10, the CPU 13A, 13B acquires one command from the target command queue (SP11) and by controlling the host controllers 12A, 12B, data transfer controllers 14A, 14B and the drive controllers 16A, 16B and the like according to the acquired command, data transfer between the storage device 10 and the host computer 2 is executed (SP12). As a result, if the command is a write command, the write data transferred from the host computer 2 is transferred to the write destination storage device 10 via the data transfer controllers 14A, 14B and if the command is a read command, the read target data that is read from the corresponding storage device 10 is transferred to the host computer 2 via the data transfer controllers 14A, 14B.

Further, when this data transfer is complete, the CPU 13A, 13B transmits a status to the effect that processing corresponding to the command is complete to the host computer 2 that transmitted the command (SP13).

The CPU 13A, 13B then executes command queue out processing to delete the command being executed from the command queue and updates each of the command check tables (SP14).

More specifically, in step SP14, the CPU 13A, 13B decrements (subtracts "1" from) the execution command counts stored in the execution command fields 22C, 23C, 24D, and 25D for all of the port unit command check table 22, the corresponding logical unit unit command check table 23, the host group unit command check table 24, and the initiator ID unit command check table 25.

In step SP14, the CPU 13A, 13B compares the execution command counts which are stored in the execution command count fields 22C, 23C, 24D, and the 25D, updated as mentioned earlier, with the receivable command counts stored in the receivable command count fields 22D, 23D, 24E, and 25G of the same entry, and if the execution command counts are smaller than the receivable command counts, the CPU 13A, 13B updates the command states stored in the command state fields 22B, 23B, 24C, and 25C to "receivable."

Further, the CPU 13A, 13B subsequently terminates the command execution processing.

Figure 11:
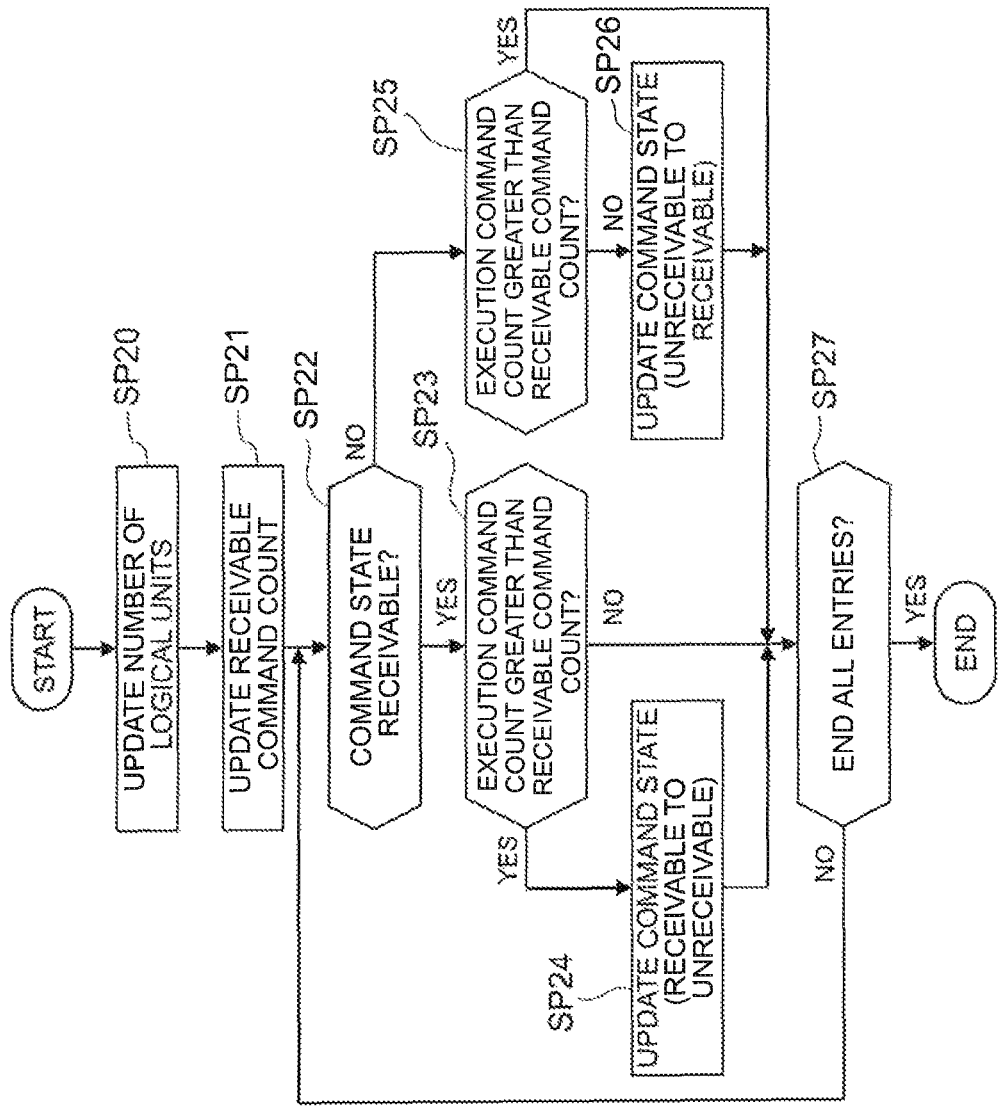
FIG. 11 is a flowchart showing a processing routine for receivable command count modification processing.

(3-3) Receivable Command Count Modification Processing (3-3-1) In Logical Unit Unit Command Check Mode FIG. 11 shows a processing routine for receivable command count modification processing which is executed by the CPU 13A, 13B in cases where the logical unit unit command check mode is configured as the command check mode, where the logical unit LU is additionally mapped to a certain port PT, and where the logical unit LU mapped to the port PT is deleted.

As mentioned earlier in FIG. 5, the receivable command count field 23D in the logical unit unit command check table 23 stores the receivable command counts calculated using equation (1) above this case, the receivable command counts are numerical values which are determined according to the number of logical units LU mapped to the corresponding ports PT, as can also be seen from equation (1). Accordingly, if a logical unit LU which is mapped to port PT is added or deleted, it is necessary to update the receivable command count stored in the receivable command count field 23D of each entry in the logical unit unit command check table 23 associated with the port PT.

Furthermore, if the receivable command count is updated, there is sometimes a change in the command state of the logical unit LU. For example, even when the command state of a certain logical unit LU is "unreceivable," if a logical unit mapped to a corresponding port PT is deleted, there is then an increase in the receivable command count assigned to the individual logical units LU mapped to the port PT, and therefore the command state of the logical unit LU may become "receivable." Thus, if the receivable command count is updated, the command states of each of the logical units LU mapped to the corresponding port PT must also be confirmed and updated if necessary.

Therefore, in cases where the logical unit unit command check mode is configured as the command check mode, where a logical unit LU is additionally mapped to a certain port PT, and where the logical unit LU mapped to the port PT is deleted, the CPU 13A, 13B of the storage apparatus 5 executes first receivable command count update processing to update the logical unit unit command check table 23 which is associated with the port PT according to the processing routine shown in FIG. 11.

In reality, in a case where the logical unit unit command check mode is configured as a command check mode, the CPU 13A, 13B additionally maps the logical unit LU to a certain port (hereinafter this is called the target port) PT, or upon receipt of a command (hereinafter called a logical unit add/delete command) to the effect that the logical unit LU mapped to the target port PT should be deleted, starts the first receivable command count update processing and first updates the logical unit count stored in the logical unit count field 21B (FIG. 3) in the command reception check main table 21 (FIG. 3) which is associated with the target port PT (SP20).

More specifically, if the logical unit add/delete command is a command instructing that logical units LU be mapped to the target port PT, the CPU 13A, 13B updates the logical unit count stored in the logical unit count field 21B of the command reception check main table 21 to a value obtained by adding the corresponding number of logical units to be added. Further, if the logical unit add/delete command is a command instructing that the logical units LU mapped to the target port PT be deleted, the CPU 13A, 13B updates the logical unit count stored in the logical unit count field 21B of the command reception check main table 21 to a value obtained by subtracting the number of logical units to be deleted.

Subsequently, the CPU 13A, 13B uses the logical unit count after the logical units LU have been added or deleted based on this logical unit add/delete command as the logical unit count LUV of the foregoing equation (1) to calculate the receivable command count $CRIV_{LU}$ assigned to the individual logical units LU mapped to the target port PT using equation (1) and updates the receivable command count, which is stored in the receivable command count field 23D (FIG. 5) of each entry in the logical unit unit command check table 23 (FIG. 5) associated with the target port PT, to the receivable command count which is then calculated (SP21).

Among the entries in the corresponding logical unit unit command check table 23, the CPU 13A, 13B then selects one entry for which processing, described subsequently in steps SP22 to SP27, has not been executed, and determines whether the command state stored in the command state field 23B (FIG. 5) of this entry is "receivable," which represents a state where commands can be received (SP22).

Further, upon obtaining an affirmative result in this determination, the CPU 13A, 13B determines whether the execution command count stored in the execution command count field 23C (FIG. 5) of this entry is greater than the receivable command count stored in the receivable command count field 23D of this entry which was updated in step SP21 (SP23).

Obtaining an affirmative result in (his determination means that, as a result of the receivable command count being updated in step SP21, the execution command count of this logical unit LU is greater than the receivable command count newly assigned to the corresponding logical unit LU, and therefore commands targeting the logical unit LU can no longer be received. Accordingly, the CPU 13A, 13B then updates the command state stored in the command state field 238 of the corresponding entry of the corresponding logical unit unit command check table 23 from "receivable" to "unreceivable" (SP24) and then advances to step SP27.

However, obtaining a negative result in the determination of step SP23 means that, even after the receivable command count is updated in step SP21, the receivable command count newly assigned to the corresponding logical unit LU is greater than the execution command count of the logical unit LU, and therefore a state is assumed in which commands targeting the logical unit LU can be continuously received. The CPU 13A, 13B accordingly advances to step SP27 without updating the command state stored in the command state field 23B of the corresponding entry in the corresponding logical unit unit command check table 23.

If, however, a negative result is obtained in the determination of step SP22, the CPU 13A, 13B determines whether the execution command count stored in the execution command count field 23C of this entry is greater than the receivable command count stored in the receivable command count field 23D of this entry that was updated in step SP21 (SP25).

Obtaining an affirmative result in this determination means that, even after the receivable command count is updated in step SP21, the execution command count of the logical unit LU is greater than the receivable command count newly assigned to the corresponding logical unit LU and therefore commands targeting the logical units LU can no longer be received. Accordingly, the CPU 13A, 13B advances to step SP27 without updating the command state stored in the command state field 23B of the corresponding entry in the corresponding logical unit unit command check table 23.

On the other hand, obtaining a negative result in the determination of step SP25 means that, as a result of updating the receivable command count in step SP21, the receivable command count that is newly assigned to the corresponding logical unit LU is greater than the execution command count of this logical unit LU and hence a state is assumed where commands targeting the logical unit LU can be received.

Accordingly, the CPU 13A, 13B updates the command state stored in the command state field 23B of the corresponding entry in the corresponding logical unit unit command check table 23 from "unreceivable" to "receivable" (SP26) and then advances to step SP27.

Furthermore, upon advancing to step SP27, the CPU 13A, 13B determines whether execution of the processing of steps SP22 to SP26 is complete for all the entries in the corresponding logical unit unit command check table 23 (SP27). Upon obtaining a negative result in this determination, the CPU 13A, 13B returns to step SP22 and subsequently repeats the processing of steps SP22 SP27.

Further, if an affirmative result is obtained in step SP27 as a result of the processing described earlier with reference to steps SP22 SP26 being completed before long for all the entries in the logical unit unit command check table 23, the CPU 13A, 13B terminates the first receivable command count update processing.

(3-3-2) In Host Group Unit Command Check Mode

As described earlier with reference to FIG. 6, the receivable command count field 24E in the host group unit command check table 24 stores the receivable command count calculated using the foregoing equation (2). In this case, as is also clear from equation (2), the receivable command count is a numerical value that is determined according to the number of host groups created in the corresponding port PT. Accordingly, if the host group created in the port PT is added or deleted, it is necessary to update the receivable command count which is stored in the receivable command count field 24E of each entry in the host group unit command check table 24 associated with the port PT.

Furthermore, if the receivable command count is updated, there is sometimes a change in the command state of the host group. For example, even when the command state of a certain host group is "unreceivable," if a host group created in the corresponding port PT is deleted, there is then an increase in the receivable command count assigned to the remaining host group created in the port PT, and therefore the command state of the host group may become "receivable." Thus, if the receivable command count is updated, the command states of each of the host groups created in the corresponding port PT must also be confirmed and updated if necessary.

Here, in cases where a new host group is additionally created in the port PT for which the host group unit command check mode has been configured as the command check mode, and where the host group created in the port PT is deleted, the processing for updating the corresponding host group unit command check table 24 is the same as the processing of the receivable command count modification processing described earlier with reference to FIG. 11. Accordingly, the specific processing content of the processing by the CPU 13A, 13B will not be described here.

In addition, according to this embodiment, when a hog group is created, the host group has a built-in priority configuration function enabling the priority (priority level) to be configured for the host group. Further, the host group unit command check mode is selected as the command check mode of the storage apparatus 5 to be selected and if a priority validation mode which validates priorities configured for each of the host groups is configured, receivable command counts in numbers corresponding to the priority types are assigned to each of the host groups.

Here, in the case of this embodiment, priority types include a high priority type which has a high priority and a low priority type with a low priority. In this case, the receivable command count assigned to each of the host groups configured with a high priority and each of the host groups configured with a low priority are determined as follows.

First, supposing that the number of host groups configured with a high priority is Cnt(High–HG), the number of host groups configured with a low priority is Cnt(Low–HG), the ratio of the receivable command count assigned to the high priority host group is Rh, the ratio of the receivable command count assigned to the low priority host group is Rl, and the entries in the corresponding command queue are assigned to the host groups configured with a high priority and to host groups configured with a low priority according to this ratio, the number of entries per ratio "1" (hereinafter called the number of unit entries) E (unit) is calculated using the following equation Math 4

$$E(\text{unit}) = \frac{CCE}{Rh \times Cnt(\text{High}-HG) + Rl \times Cnt(\text{Low}-HG)} \quad (4)$$

Note that, in equation (1), CCE represents the total entry count in the corresponding command queue.

Therefore, in the total entry count CCE, the entry count E(unit–High) which is to be assigned to a single host group configured with a high priority is calculated using the following equation Math 5

$$E(\text{unit}-\text{High}) = [E(\text{unit})] \times Rh \quad (5)$$
$$= \frac{CCE \times Rh}{Rh \times Cnt(\text{High}-HG) + Rl \times Cnt(\text{Low}-HG)}$$

where (E(unit) is the integer portion of equation (4), and the entry count E(unit–Low) which is to be assigned to a single host group configured with a low priority is calculated using the following equation Math 6

$$E(\text{unit}-\text{Low}) = [E(\text{unit})] \times Rl \quad (6)$$
$$= \frac{CCE \times Rl}{Rl \times Cnt(\text{High}-HG) + Rl \times Cnt(\text{Low}-HG)}$$

However, if the unit entry count E(unit) calculated using equation (4) has a fractional portion, even if the total of the entry count E(unit–High), assigned to host groups configured with a high priority, is added to the total of the entry count E(unit–Low) assigned to host groups configured with a low priority, the value obtained is smaller than the total entry count CCE of the corresponding command queue, and entries (hereinafter called the remaining entries) in a quantity which is calculated using the following equation Math 7

$$CCE(R) \geq CCE - Rh \times E(\text{unit-High}) + Rl \times E(\text{unit-Low}) \quad (7)$$

are assigned to both host groups configured with a high priority and host groups configured with a low priority.

Hence, in the case of this embodiment, if the following equation is valid

Math 8

$$CCE(R) \geq CCE - Rh \times Cnt(\text{High}-HG) + Rl \times Cnt(\text{Low}-HG) \quad (8)$$

CCE in equation (4) is replaced with the remaining entry count CCE(R), and the entry count E(unit–High) which is to be assigned to a single host group configured with a high priority is calculated using equation (5), and the entry count E(unit–Low) which is to be assigned to a single host group configured with a low priority is calculated using equation (6).

Further, by adding the entry count E(unit–High) calculated at the time to the entry count E(unit–High) calculated beforehand, a new entry count E(unit–High) is calculated, and by adding this entry count E(unit–Low) to the entry count E(unit–Low) calculated beforehand, a new entry count E(unit–Low) is calculated.

In addition, a new remaining entry count CCE(R) is calculated by means of equation (7) by using the new entry count E(unit–High) and E(unit–Low) which are then obtained, and if the new remaining entry count CCE(R) satisfies equation (8), the same processing is repeated until the remaining entry count CCE(R) satisfies the following equation Math 9

$$CCE(R) < CCE - Rh \times Cnt(\text{High}-HG) + Rl \times Cnt(\text{Low}-HG) \quad (9)$$

Further, when, before long, the remaining entry count CCE (R) satisfies equation (9), the remaining entry count CCE(R) at the time is assigned uniformly to each of the host groups configured with a high priority.

The entry count E(unit–High) obtained by means of the foregoing processing is determined as the receivable command count to be assigned to host groups configured with a high priority, and the entry count E(unit–Low) obtained by means of the foregoing processing is determined as the receivable command count to be assigned to the host group configured with a low priority.

For example, suppose that the total entry count CCE of the corresponding queue command is "512", that the quantity of host groups configured with a high priority is "2", and that the quantity of host groups configured with a low priority is "3", then, as shown in FIG. 12, the receivable command count ratio Rh assigned to the high-priority host groups is "3" and the receivable command count ratio Rl assigned to the low-priority host groups is "1". The unit entry count E(unit) at the time is calculated per the following equation Math 10

$$E(\text{unit})=512/(3\times2+1\times3)=56.88\approx56 \quad (10)$$

Accordingly, the entry count E(unit–High) which is to be assigned to a single host group configured with a high priority is calculated per the following equation Math 11

$$E(\text{unit-High})=56\times3=168 \quad (11)$$

and the entry count E(unit–Low) to be assigned to a single host group configured with a low priority is calculated per the following equation Math 12

$$E(\text{unit-Low})=56\times1=56 \quad (12)$$

Hence, according to equations (10) to (12), the remaining entry count CCE(R) is found from the following equation Math 13

$$CCE(R)=512-(168\times2+56\times3)=8 \quad (13)$$

The remaining entry count CCE(R) is a smaller number than the denominator of equation (10), and hence when the remaining entry count CCE(R) is assigned uniformly to each of the host groups configured with a high priority, the entry count CCE(R−High) assigned to a single host group configured with a high priority is Math 14

$$CCE(R\text{-High})=8/2=4 \qquad (14)$$

Accordingly, the entry count (receivable command count CR(High=HG)) which is assigned to a single host group configured with a high priority is "172" as per the following equation Math 15

$$CR(\text{High}-HG)=168+4=172 \qquad (15)$$

and the entry count (receivable command count CR (Low−HG)) which is assigned to a single host group configured with a low priority is "56" according to equation (12).

FIG. 13 relates to the foregoing priority configuration function and shows a processing routine for priority configuration/modification processing which is executed by the CPU 13A, 13B of the storage apparatus 5 if, in cases where the host group unit command check mode is selected as the command check mode and the priority validation mode is configured and where a host group is additionally created in a certain port (hereinafter called a target port) PT or a created host group is deleted. According to the processing routine shown in FIG. 13, the CPU 13A, 13B determines the receivable command count for each host group and configures the receivable command count thus determined in the receivable command count field 24E in the corresponding host group unit command check table 24.

In reality, in a case where the host group unit command check mode is configured as a command check mode and where a priority validation mode is configured, and when a host group is additionally created in the target port PT or a created host group is deleted, the CPU 13A, 13B starts the priority configuration processing and first refers to the host group count field 21C of the command reception check main table 21 associated with the target port PT and acquires the number of host groups created in the target port PT (SP30).

The CPU 13A, 13B subsequently calculates the unit entry count using equation (4) above (SP31) and then, using equations (5) and (6) above, calculates the entry count E(unit−High) assigned to a single host group configured with a high priority and the entry count E(unit−Low) assigned to a single host group configured with a low priority respectively (SP32).

The CPU 13A, 13B then calculates the remaining entry count CCE(R) using equation (7) above (SP33) and determines whether or not the remaining entry count CCE(R) satisfies equation (9) (SP34).

If a negative result is obtained in this determination, the CPU 13A, 13B returns to step SP31 and subsequently repeats the processing of steps SP31 to SP34 by replacing the entry count CCE in equation (4) in step SP31 with the remaining entry count CCE(R). Note that the method of determining the entry counts of the host groups configured with a high priority and the host groups configured with a low priority in step SP32 at the time is as described hereinabove.

Further, if an affirmative result is obtained in step SP34 as a result of the remaining entry count CCE(R) ultimately satisfying equation (9), the CPU 13A, 13B determines, as a result of the foregoing processing, the entry count E(unit−High) assigned to the host group configured with a high priority, as the receivable command count CR (High−HG) which is assigned to the host groups configured with the high priority, determines, as a result of the foregoing processing, the entry count E(unit−Low) which is assigned to the host groups configured with a low priority as the receivable command count CR(Low−HG) which is to be assigned to the host groups configured with a low priority, and updates the corresponding host group unit command check table 24 (FIG. 6) on the basis of the determination result (SP35).

More specifically, the CPU 13A, 13B stores the high-priority receivable command count CR(High−HG) which was determined as described above in the receivable command count field 25G of the entry corresponding to the host group where a code ("0" in FIG. 6) representing a high priority is stored in the priority field 24B (FIG. 6) among the entries in the host group unit command check table 24 and stores the low-priority receivable command count CR(Low−HG) which was determined as described above in the receivable command count field 25G of the entry corresponding to the host group where a code ("1" in FIG. 6) representing a low priority is stored in the priority field 24B (FIG. 6) among the entries in the host group unit command check table 24.

By repeatedly executing processing similar to steps SP22 to SP27 of the receivable command count modification processing described earlier with reference to FIG. 11, the CPU 13A, 13B subsequently updates, if necessary, the command states stored in the command state field 24C for each of the entries in the host group unit command check table 24 (SP36) and then terminates the priority configuration/modification processing.

(3-3-3) In Initiator ID Unit Command Check Mode

As described earlier with reference to FIG. 7, the receivable command count field 25G of the initiator ID unit command check table 25 stores the receivable command count calculated using equation (3) above. In this case, as is also clear from equation (3), the receivable command count is a numerical value which is determined according to the quantity of I/O execution host computers 2 logged on via the corresponding port PT. Accordingly, if there is an increase or reduction in the I/O execution host computers 2 which are logged on via the port PT, the receivable command count stored in the receivable command count field 25G of each entry in the initiator ID unit command check table 25 associated with the port PT must be updated.

Further, if the receivable command count is updated, the command state of each I/O execution host computers 2 may change. For example, even if the command state of a certain I/O execution host computer 2 is "unreceivable," in cases where there is a reduction in the other I/O execution host computers 2 logged on via the corresponding port PT, since there is then an increase in the receivable command count assigned to the individual I/O execution host computers 2 logged on via the port PT, the command state of the I/O execution host computer 2 may be "receivable." Accordingly, if the receivable command count is updated, the command states of the other I/O execution host computers 2 logged on via the corresponding poll PT must also be confirmed and if necessary updated.

Figure 14:
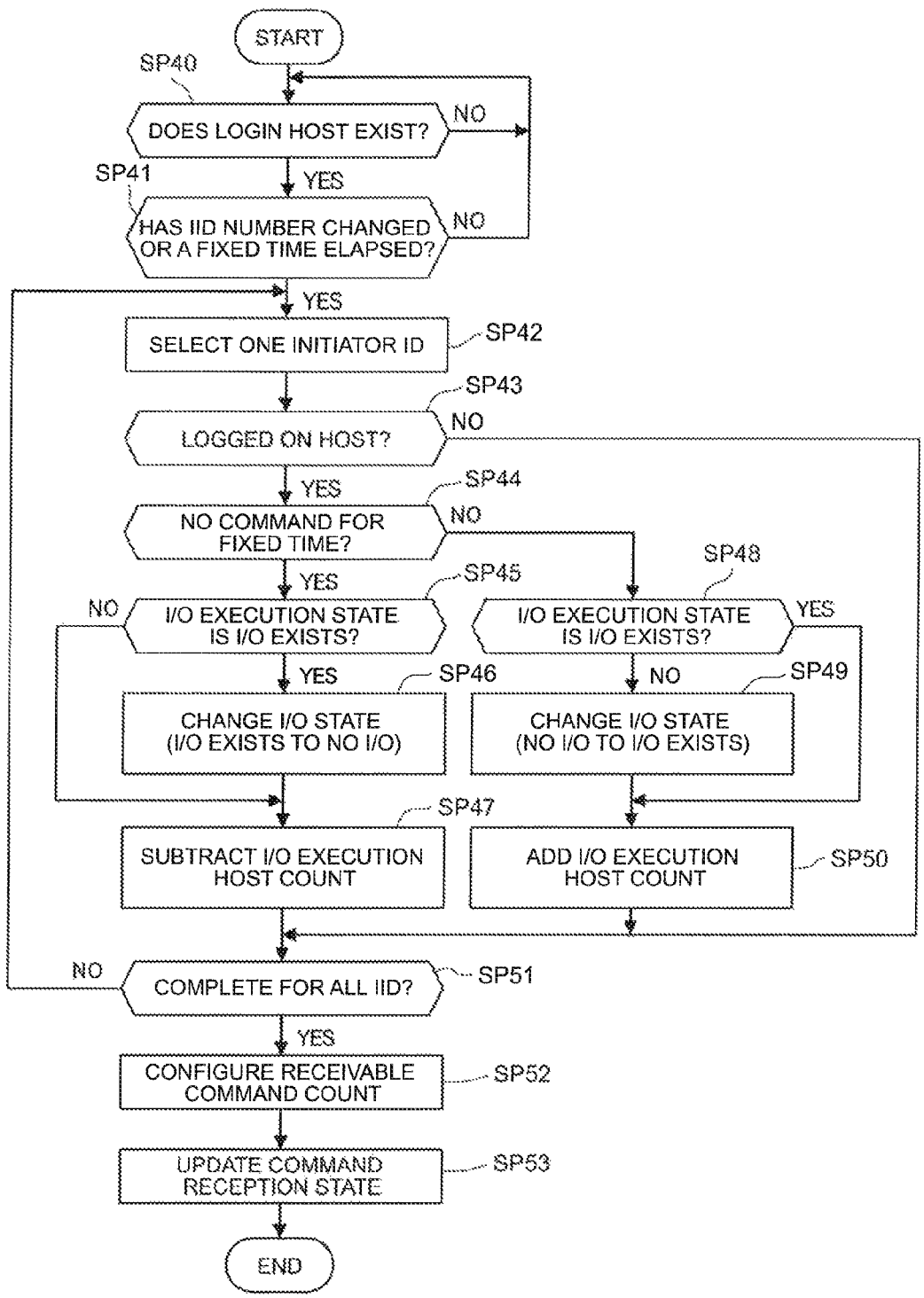
FIG. 14 is a flowchart showing a processing routine for optimization processing.

Therefore, by executing the optimization processing shown in FIG. 14 at regular intervals or each time the number of initiator IDs is changed for each port PT, the CPU 13A, 13B of the storage apparatus 5 dynamically optimizes each initiator ID unit command check table.

In other words, upon starting this optimization processing, the CPU 13A, 13B first determines whether there exists a host computer 2 which has logged on via the port (target port) being targeted at the time (SP40). More specifically, the CPU 13A, 13B determines step SP40 based on whether the initiator ID count stored in the initiator ID count field 21D in the command reception check main table 21 (FIG. 3) corresponding to the target port PT is "0". If a negative result is obtained in this determination, the CPU 13A, 13B waits for the host computer 2 to log on via the target port PT.

Further, when either host computer 2 logs on before long via the target port PT, the CPU 13A, 13B determines whether the initiator ID count associated with the target port has changed between when the optimization processing was last executed and the current time (that is, whether a host computer 2 has logged on or logged out via the target port PT) or whether a fixed time (hereinafter called the optimization execution cycle time) has elapsed since the optimization processing is executed (SP41). Further, the CPU 13A, 13B returns to step SP40 once a negative result is obtained in this determination.

If, on the other hand, an affirmative result is obtained in the determination of step SP41, the CPU 13A, 13B refers to the corresponding host group unit command check table 24 and selects one initiator ID which is assigned to a host computer 2 that is logged on via the target port PT (SP42), and determines whether or not the host computer 2 to which this initiator ID has been assigned is currently logged on (SP43).

If a negative result is obtained in the determination, the CPU 13A, 13B advances to step SP51, and if, on the other hand, an affirmative result is Obtained, the CPU 13A, 13B determines whether the command from the host computer 2 to which the initiator ID is assigned has been received within the foregoing command reception threshold time (that is, whether the host computer 2 is art I/O execution host computer 2) (SP44). More specifically, the CPU 13A, 13B reads the time (hereinafter called the command reception time) that the command was last received from the host computer 2 from the command reception time field 25E for the entry associated with the initiator ID in the corresponding initiator ID unit command check table 25 (FIG. 7), and subtracts the command reception time from the current time. Further, the CPU 13A, 13B determines whether or not the subtraction result is greater than the command reception threshold time.

If an affirmative result is Obtained in this determination, the CPU 13A, 13B determines whether or not the I/O execution state stored in the I/O execution state field 25F of the entry associated with the initiator ID in the corresponding initiator ID unit command check table 25 is "I/O exists," which indicates that a command from the host computer has been received within the foregoing command reception threshold time (SP45).

Further, the CPU 13A, 13B advances to step SP47 when a negative result is obtained in this determination, whereas if an affirmative result is obtained, the CPU 13A, 13B updates the I/O execution state stored in the I/O execution state field 25F of the entry associated with the initiator ID in the corresponding initiator ID unit command check table 25 to "no I/O," which indicates that a command from the host computer 2 has not been received within the command reception threshold time (SP46).

Thereafter, the CPU 13A, 13B decrements (subtracts "1" from) the I/O execution host count stored in the I/O execution host count field 21E in the corresponding command reception check main table 21 (FIG. 3) (SP47) and then advances to step SP51.

If, on the other hand, a negative result is obtained in the determination of step SP44, the CPU 13A, 13B determines whether the I/O execution state stored in the I/O execution state field 25F of the entry associated with the initiator ID in the corresponding initiator ID unit command check table 25 is "I/O exists", which indicates that a command from the host computer 2 has been received within the foregoing command reception threshold time (SP48).

If an affirmative result is obtained in e determination, the CPU 13A, 13B advances to step SP50, whereas if a negative result is obtained, the CPU 13A, 13B updates the I/O execution state stored in the I/O execution state field 25F of the entry associated with the initiator ID in the initiator ID unit command check table 25 to "I/O exists", which indicates that a command from the corresponding host computer 2 has been received within the foregoing command reception threshold time (SP49).

The CPU 13A, 13B then increments (adds "1" to) the I/O execution host count stored in the I/O execution host count field 21E of the command reception check main table 21 associated with the target port PT (SP50) and subsequently advances to step SP51.

Upon advancing to step SP51, the CPU 13A, 13B determines whether the processing of steps SP42 to SP50 has been executed for all the initiator IDs assigned to each of the host computers 2 logged on via the target port PT (SP51).

Further, if a negative result is obtained in this determination, the CPU 13A, 13B returns to step SP42 and subsequently repeats the processing of steps SP42 to SP50 while sequentially switching the initiator ID selected in step SP42 for the other unprocessed initiator IDs.

In addition, when before long an affirmative result is obtained in step SP51 by ending the execution of the processing of steps SP42 to SP50 for all the initiator IDs assigned to each of the host computers 2 logged on via the target port PT, the CPU 13A, 13B reconfigures the receivable command count stored in the receivable command count field 25G (FIG. 7) of each of the entries in a corresponding initiator ID unit command check table 25 (FIG. 7) based on a new I/O execution host count (SP52).

More specifically, the CPU 13A, 13B refers to the I/O execution host count field 21E (FIG. 3) of the corresponding command reception check main table 21 (FIG. 3) updated by the processing of steps SP42 to SP50 and acquires the quantity of I/O execution host computers 2 among the host computers 2 logged onto the storage apparatus 5 via the target port PT. Further, by dividing the number of command queue entries associated with the target port PT by the number of I/O execution host computers 2, the CPU 13A, 13B calculates the new receivable command count for the individual initiator IDs. Furthermore, the CPU 13A, 13B configures the calculated receivable command counts in each of the receivable command count fields 25G of each of the entries in the corresponding initiator ID unit command check table 25.

By repeatedly executing, if necessary, the same processing as the steps SP22 SP27 of the receivable command count modification processing described earlier with reference to FIG. 11, the CPU 13A, 13B then updates, where necessary, the command state stored in the command state field 25C of each of the entries in the initiator ID unit command check table 25 (SP53), and subsequently terminates the priority configuration/modification processing.

(3-4) Command Check Mode Switching Processing

Figure 15:
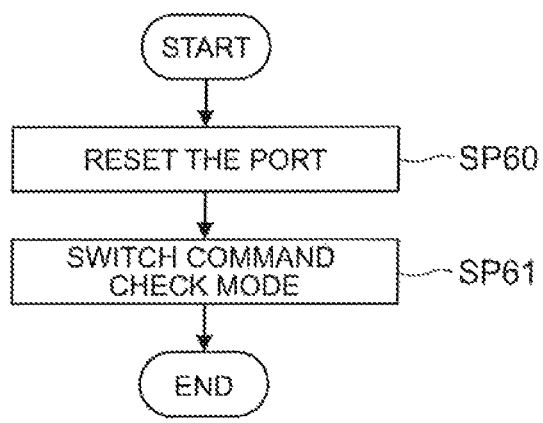
FIG. 15 is a flowchart showing a processing routine for command check mode switching processing.

FIG. 15 shows a processing routine for a command check mode switching processing which is executed by the CPU 13A, 13B of the storage apparatus 5 which receives a command for switching the command check mode (hereinafter called the command check mode switching command) which is transmitted from the management apparatus 3 in response to the operation of the system administrator. The CPU 13A, 13B switches the command check mode of the storage apparatus 5 to the command check mode designated by the command check mode switching command according to the processing routine shown in FIG. 15.

In other words, upon receipt of the command check mode switching command, the CPU 13A, 13B starts the command check mode switching processing and first performs processing to reset all the ports PT of each of the host controllers 12A, 12B (FIG. 1) of the storage apparatus 5 (SP60).

More specifically, if communications with the host computer 2 are performed via any of the ports PT in step SP60, the CPU 13A, 13B suspends the communications and cancels all the commands from the host computers 2 supplied to each of the ports PT. Further, the CPU 13A, 13B transmits a processing command suspending communications, and transmits an error notification to the effect that processing has ended abnormally based on the command to the host computer 2 that issued the cancel command or that processing based on this command has not been executed.

The CPU 13A, 13B then switch the command check mode of the storage apparatus 5 to the command check mode designated by the command check mode switching command (SP61). More specifically, the CPU 13A, 13B rewrites the command check mode stored in the configuration command check mode field 21A to the command check mode designated in the command check mode switching command for all the command reception check main tables 21 stored in the memory 15A, 15B.

The CPU 13A, 13B then terminate the command check mode switching processing.

(4) Advantageous Effects of Embodiment

As described hereinabove, in the computer system 1 according to this embodiment, command check modes provided are the port unit command check mode, the logical unit unit command check mode, the host group unit command check mode, and the initiator ID unit command check mode, where, in the port unit command check mode, the receivable command counts are managed in port units, in the logical unit unit command check mode, the receivable command counts are managed in logical unit units, in the host group unit command check mode, the receivable command counts are managed in host group units, and in the initiator ID unit command check mode, the receivable command counts are managed in initiator ID units (host computer units).

Therefore, with this computer system, even in a case where there is a high load host computer among the host computers using the same port, it is possible to prevent the effect of the high load host computer 2 on the other host computers using different logical units from this host computer, on the other host computers which belong to a different host group from the host computer, or on other host computers. Thus, a storage apparatus capable of preventing deterioration in the response performance of the whole system effectively and in advance can be realized.

(5) Further Embodiments

Note that, in the foregoing embodiments, a case was described in which only the host computer (I/O execution host computer) 2 which actually issued an I/O command is taken as the target for dividing up the number of command queue entries in initiator ID unit command check mode. However, the present invention is not limited to such a case, rather, a host computer which has logged on but not issued an I/O within a fixed time may also serve as the target for dividing up the number of command queue entries in initiator ID unit command check mode.

In this case, in the initiator ID unit command check mode, receivable command counts which are assigned to individual initiator IDs are calculated by dividing the number of command queue entries associated with the target ports PT by the number of initiator IDs assigned to the logged on host computers 2 via the target port PT and the receivable command counts may be registered in the corresponding initiator ID unit command check table 25.

A case was described in the foregoing embodiment in which the command check modes can be configured only for the whole storage apparatus 5; however, the present invention is not limited to such a case, rather, the desired command check mode may also be configured in port units.

Furthermore, a case was described in the foregoing embodiment in which the configuration of priorities can be performed only in host group unit command cheek mode; however, the present invention is not limited to such a case, rather, configuration of logical units or initiator IDs may also be performed in logical unit unit command check mode and initiator ID unit command check mode or the like.

In addition, a case was described in the foregoing embodiment in which the numbers of priorities in host group unit command check mode are in two stages, namely, high priority and low priority; however, the present invention is not limited to such a case, rather, priorities may also be provided in three or more stages.

Furthermore, a case was described in the foregoing embodiment in which the storage apparatus 5 is provided with all the command check modes, namely, a port unit command check mode, a logical unit unit command check mode, a host group unit command check mode, and an initiator ID unit command check mode; however, the present invention is not limited to such a case, rather, at least one command check mode may instead be provided among the logical unit unit command check mode, the host group unit command check mode, and the initiator ID unit command check mode to thus enable the effects corresponding to this command check mode.

INDUSTRIAL APPLICABILITY

The present invention relates to a storage apparatus and a method for controlling same and can be widely applied to storage apparatuses which comprise a function for managing the number of receivable commands from the host computer.

| Reference Signs List | |
| --- | --- |
| 1 | Computer system |
| 2 | Host computer |
| 3 | Management apparatus |
| 5 | Storage apparatus |
| 10 | Storage device |
| 13A, 13B | CPU |
| 20 | Command check program |
| 21 | Command reception check main program |
| 22 | Port unit command check program |
| 23 | Logical unit unit command check program |
| 24 | Host group unit command check program |
| 25 | Initiator ID unit command check program |
| 26 | Login management table |

The invention claimed is:

1. A storage apparatus which provides a host computer with one or more storage areas which are storage areas for reading and writing data and which reads and writes data to the corresponding storage areas on the basis of commands supplied from the host computer, the storage apparatus comprising:

a management unit which manages the number of commands that can be received;

a storage unit which stores preconfigured management modes for managing the number of commands that can be received; and one or more ports connected to the host computers, wherein the management modes comprise at least one management mode among a first management mode for managing the number of receivable commands for each of the storage areas, a second management mode for managing the number of receivable commands in host group units which are sets of one or more of the host computers, and a third management mode for managing the number of receivable commands in identification information units assigned to the logged on host computers, wherein the management unit manages the number of receivable commands supplied from the host computer according to the management modes stored in the storage unit, wherein commands from the host computers are received via the ports, wherein a command queue having a predetermined number of entries is configured for each of the ports, and wherein the management unit, if the third management mode is configured as the management mode, divides the number of command queue entries, which are configured so as to correspond to the ports, among each of the identification information assigned to each of the host computers logged on via the ports and manages the number of receivable commands of each of the host computers so that the number of commands from the host computers stored in the command queue is in the range of the number of entries divided among the identification information assigned to the host computers.

2. The storage apparatus according to claim 1, further comprising:

wherein the management unit, if the first management mode is configured as the management mode, divides the number of command queue entries, which are configured so as to correspond to the ports, among each of the storage areas connected to the ports and manages the number of receivable commands of each of the storage areas so that the number of commands targeting the storage areas stored in the command queue is in the range of the number of entries divided among the storage areas.

3. The storage apparatus according to claim 1, further comprising:

wherein the management unit, if the second management mode is configured as the management mode, divides the number of command queue entries, which are configured so as to correspond to the ports, among each of the host groups created in the ports and manages the number of receivable commands of each of the host groups so that the number of commands from the host groups stored in the command queue is in the range of the number of entries divided among the host groups.

4. The storage apparatus according to claim 3, wherein the storage unit stores priority levels which are preconfigured for each of the host groups, and wherein the management unit, if the second management mode is configured as the management mode, divides the number of command queue entries, which are configured so as to correspond to the ports on the basis of the priority level for each of the host groups stored in the storage unit, among each of the host groups created in the ports in a ratio which corresponds to the priority level configured for each of the host groups.

5. The storage apparatus according to claim 1, wherein the management unit manages, for each of the ports, the state of issuance of the commands of the host computers which have logged on via the ports, and wherein, if the third management mode has been configured as the management mode, the management unit divides the number of command queue entries, which are configured so as to correspond to the ports, among the identification information assigned to the host computer that issued a command within a predetermined time among the host computers which have logged on via the ports.

6. A method for controlling a storage apparatus which provides a host computer with one or more storage areas, which are storage areas for reading and writing data and which reads and writes data to the corresponding storage areas on the basis of commands supplied from the host computer, and comprises one or more ports connected to the host computers, the method comprising:

a first step of storing preconfigured management modes for managing the number of commands that can be received; and a second step of managing the number of receivable commands supplied from the host computer according to the management modes stored in the storage unit, wherein the management modes comprise at least one management mode among a first management mode for managing the number of receivable commands for each of the storage areas, a second management mode for managing the number of receivable commands in host group units which are sets of one or more of the host computers, and a third management mode for managing the number of receivable commands in identification information units assigned to the logged on host computers, wherein commands from the host computers are received via the ports, and wherein a command queue having a predetermined number of entries is configured for each of the ports, and wherein, in the second step, if the third management mode is configured as the management mode, the number of command queue entries, which are configured so as to correspond to the ports, is divided among each of the identification information assigned to each of the host computers logged on via the ports and the number of receivable commands of each of the host computers is managed so that the number of commands from the host computers stored in the command queue is in the range of the number of entries divided among the identification information assigned to the host computers.

7. The method for controlling a storage apparatus according to claim 6, wherein:

in the second step, if the first management mode is configured as the management mode, the management unit divides the number of command queue entries, which are configured so as to correspond to the ports, among each of the storage areas connected to the ports and manages the number of receivable commands of each of the storage areas so that the number of commands targeting the storage areas stored in the command queue is in the range of the number of entries divided among the storage areas.

8. The method for controlling a storage apparatus according to claim 6, wherein:

in the second step, if the second management mode is configured as the management mode, the number of command queue entries, which are configured so as to correspond to the ports, are divided among each of the host groups created in the ports, and the number of receivable commands for each of the host groups is managed so that the number of commands from the host groups stored in the command queue is in the range of the number of entries divided among the host groups.

9. The method of controlling the storage apparatus according to claim 8, wherein, in the first step, priority levels which are preconfigured for each of the host groups are stored, and wherein, in the second step, if the second management mode is configured as the management mode, the number of command queue entries, which are configured so as to correspond to the ports on the basis of the priority level for each of the host groups stored in the storage unit, is divided among each of the host groups created in the ports in a ratio which corresponds to the priority level configured for each of the host groups.

10. The storage apparatus according to claim 6, wherein, in the second step, the state of issuance of the commands of the host computers which have logged on via the ports is managed for each of the ports, and wherein, if the third management mode has been configured as the management mode, the number of command queue entries, which are configured so as to correspond to the ports, is divided among the identification information assigned to the host computer that issued a command within a predetermined time among the host computers which have logged on via the ports.

* * * * *